United States Patent
Musa

(10) Patent No.: US 7,034,064 B2
(45) Date of Patent: Apr. 25, 2006

(54) METHOD OF ATTACHING A DIE TO A SUBSTRATE USING A HYBRID OXETANE COMPOUND

(75) Inventor: Osama M. Musa, Hillsborough, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 173 days.

(21) Appl. No.: 10/430,089

(22) Filed: May 6, 2003

(65) Prior Publication Data

US 2004/0225074 A1    Nov. 11, 2004

(51) Int. Cl.
C08F 2/46    (2006.01)
C08G 65/02    (2006.01)

(52) U.S. Cl. .................... 522/181; 522/173; 522/178; 522/182

(58) Field of Classification Search ............... 522/181, 522/173, 178, 182
See application file for complete search history.

(56) References Cited

U.S. PATENT DOCUMENTS

| | | | |
|---|---|---|---|
| 3,867,353 A | | 2/1975 | Hsieh et al. |
| 4,225,691 A | | 9/1980 | Crivello |
| 5,981,616 A | * | 11/1999 | Yamamura et al. ......... 522/168 |
| 6,166,100 A | * | 12/2000 | Hiwara et al. ............. 522/110 |
| 6,207,728 B1 | * | 3/2001 | Sekiguchi et al. ........... 522/83 |
| 2002/0089067 A1 | | 7/2002 | Crane et al. |
| 2002/0143112 A1 | | 10/2002 | Weinert et al. |

FOREIGN PATENT DOCUMENTS

| | | |
|---|---|---|
| EP | 1 095 938 | 5/2001 |
| JP | 2001081149 | 3/2001 |
| JP | 2001-303015 | * 10/2001 |
| JP | 2001329112 | 11/2001 |
| JP | 2002150836 | 5/2004 |
| WO | WO 02/06038 02 | 1/2002 |
| WO | WO 02/06038 03 | 1/2002 |
| WO | WO 02/28985 | 4/2002 |

OTHER PUBLICATIONS

Ledwith, Anthony: "Possibilities for promoting cationic polymerization by common sources of free radicals"; *Polymer 1978*, vol. 19; Oct.; pp. 1217-1222.

Sasaki, Hiroshi et al.: "Photoinitiated Cationic Polymerization of Oxetane Formulated with Oxirane"; *Journal of Polymer Science Part A*; vol. 33; 1995; pp. 1807-1816.

Searles, Scott et al.: "Hydrogen Bonding Ability and Structure of Ethylene Oxides"; *This Journal*; 73;3704;1951.

Xianming, Hu et al.: "Phase-Transfer Synthesis of Optically Pure Oxetanes Obtained from 1,2,2-Trisubstituted 1,3-Propanediols"; *Synthesis May 1995*; pp. 533-538.

Fujiwara, Tomoko et al.: "Synthesis and Characterization of Novel Oxetane Macromonomers"; *Polymer Preprints 2003*; 44(1), 785.

Dhavalikar, R. et al.: "Molecular and Structural Analysis of a Triepoxide-Modified Poly(ethylene terephthalate) from Rheological Data"; *Journal of Polymer Science*: Part A: Polymer Chemistry; vol. 41, 958-969 (2003); pp. 958-969.

Satoh, Toshifumi et al.: "A Novel Ladder Polymer, Two-Step Polymerization of Oxetanyl Oxirane Leading to a "Fused 15-Crown-4 Polymer" Having a High Li$^+$-Binding Ability"; *Macromolecules 2003*, 36, 1522-1525.

Chen, Yu et al.: "Synthesis of Multihydroxyl Branched Polyethers by Cationic Copolymerization of 3,3-Bis(hydroxymethyl)oxetane and 3-Ethyl-3-(hydroxymethyloxetane"; *Journal of Polymer Science*: Part A: Polymer Chemistry, vol. 40, 1991-2002; 2002 Wiley Periodicals, Inc.

Nishimura, Tomonari et al.: "Chemoselective isomerization of amide-substituted oxetanes with Lewis acid to give oxazine derivatives or bicyclic amide acetals"; *Chem. Commun., 1998*; pp. 43-44.

Miwa, Yoshiyuki et al.: "Polymerization of Bis-Oxetanes Consisting of Oligo-Ethylene Oxide Chain with Lithium Salts as Initiators"; Polym. J., vol. 33, No. 8, 2001; pp. 568-574.

(Continued)

Primary Examiner—Roberto Rabago
(74) Attorney, Agent, or Firm—Jane E. Gennaro

(57) ABSTRACT

A method for attaching a silicon die to a substrate using an adhesive containing an oxetane functionality and an electron acceptor or an electron donor functionality, represented by the formula

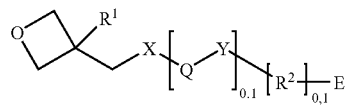

in which $R^1$ is a methyl or ethyl group, $R^2$ is a divalent hydrocarbon, X and Y are independently a direct bond, or an ether, ester, or carbamate functionality, Q is a divalent hydrocarbon, and F is an electron donor or electron acceptor functionality.

2 Claims, No Drawings

OTHER PUBLICATIONS

Ichikawa, Eiko et al.: "Synthesis of Oxetanocin A and Related Unusual Nucleosides with Bis(hydroxymethyl)-branched Sugars"; *Synthesis 2002*, No. 1, 28 12 2001; Georg Thieme Verlag Stuttgart, NY; pp. 1-28.

Minegishi, Shouji et al.: "Synthesis of Polyphosphonates Containing Pendant Chloromethyl Groups by the Polyaddition of Bis(oxetanes)s with Phosphonic Dichlorides"; *Journal of Polymer Science:* Part A: Polymer Chemistry, vol. 40 3835-3846; 2002 Wiley Periodicals, Inc.

Sasaki, Hiroshi et al.: "Photoinitiated Cationic Polymerization of Oxetane Formulated with Oxirane"; *Journal of Polymer Science*: Part A: Polymer Chemistry, vol. 33, 1807-1816; 1995 John Wiley & Sons, Inc.

Rosenbaum, Dr. Barry et al.: "Develop Better Coatings"; *Omnova Solutions Inc.*, Akron, OH; pp. 1-5.

Sasaki, Hiroshi: "Application of Oxetane Monomers for UV-Curable Material"; RadTech 2002; Tech. Conf. Proceedings; pp. 64-78.

Carter, Wells et al.: "New Oxetane Derivative Reactive Filuent for Cationic UV Cure"; *RadTech 2000*; Tech. Proceed.; pp. 641-649.

Crivello, J. V. et al.: "Diaryliodonium Salts as Thermal Initiators of Cationic Polymerization"; *Journal of Polymer Science*: Polymer Chemistry Ed, vol. 21, 97-109 (1983); John Wiley & Sons, Inc.

Lu, Yong-Hong et al.: "Synthesis of Side-Chain Liquid Crystalline Polyoxetanes Containing 4-(Alkanyloxy)phenyl trans-4-Alkylcyclohexanoate Side Groups"; *1995 American Chem. Society*; pp. 1673-1680.

Lu, Yong-Hong et al.: "Synthesis of side-chain liquid crystalline polyoxetanes containing 4-dodecanyloxphenyl trans-4-alkylcyclohexanoate side groups"; *Polymer Bulletin 32*, 551-558 (1994); Springer Verlag.

Hsu, Li-Ling et al.: "Studies on the Synthesis and Properties of Ferroelectric Side Chain Liquid Crystalline Polyoxetanes"; *Journal of Polymer Science*: Part A: Polymer Chemistry; vol. 35, 2843-2855; (1997); John Wiley & Sons, Inc.

Kawakami, Yusuke et al.: "Synthesis and Thermal Transition of Side-chain Liquid Crystalline Polyoxetanes Having Laterally Attached Mesogenic Group"; *Polymer International*; 0959-8103/93; Great Britian, 35-40.

Kawakami, Yusuke et al.: "Synthesis of Liquid Crystalline Polymers with a Polyoxetane Main Chain"; *Macromolecules*; vol. 24, No. 16, 1991; pp. 4531-4537.

Kawakami, Yusuke et al.: "Smectic liquid crystalline polyoxetane with novel mesogenic group"; *Polymer Bulletin 25*; Springer-Verlag 1991; pp. 439-442.

Crivello, J.V. et al.: "Photoinitiated Cationic Polymerization With Multifunctional Vinyl Ether Monomers"; *Journal of Radiation Curing*, Jan. 1983; pp. 6-13.

Ishizone, Takashi et al.: "Protection and Polymerization of Functional Monomers. 29. Syntheses of Well-Defined Poly[(4-vinylphenyl)acetic acid], Poly [3-(4-vinylphenyl)propionic acid], and Poly(3-vinylbenzoic acid) by Means of Anionic Living Polymerizations of Protected Monomers Bearing Bicyclic Ortho Ester Moieties"; *Macromolecules 1999*, 32, 1453-1462.

Sato, Kazuya et al.: "New Reactive Polymer Carrying a Pendant Oxetane Ring"; *Macromolecules 1992*, 25, 1198-1199; Communications to the Editor.

Moussa, K. et al.: "Light-Induced Polymerization of New Highly Reactive Acrylic Monomers"; *Journal of Polymer Science*: Part A: Polymer Chemistry, vol. 31, 2197-2203 (1993); John Wiley & Sons, Inc.

Kawakami, Yusuke et al.: "Synthesis of Liquid Crystalline Polyoxetanes Bearing Cyanobiphenyl Mesogen and Siloxane-Containing Substituent in the Repeating Unit"; *Polymer Journal*, vol. 28, No. 10, pp. 845-850 (1996).

Crivello, J. V. et al.: "Synthesis and Photopolymerization of Silicon-Containing Multifunctional Oxetane Monomers"; *J.M.S.-Pure Appl. Chem.*, A30(2 & 3), pp. 173-187 (1993); Marcel Dekker, Inc.

Chappelow, C. C. et al.: "Photoreactivity of Vinyl Ether/ Oxirane-Based Resin Systems"; *Journal of Applied Polymer Science*, vol. 86, 314-326 (2002); Wiley Periodicals, Inc.

Toagosei Co. Ltd.: "Developing Monomers", Aug. 2002.

Hou, Jian et al.: "Synthesis of a Star-Shaped Copolymer with a Hyperbranched Poly(3-methyl-3-oxetanemethanol) Core and Tetrahydrofuran Arms by One-Pot Copolymerization"; *Macromol. Rapid Commun.* 2002, 23, 456-459.

Xu, Jun et al.: "Study On Cationic Ring-Opening Polymerization Mechanism of 3-Ethyl-3-Hydroxymethyl Oxetane"; *J. Macromol. Sci.*-Pure Appl. Chem., A39(5), 431-445 (2002); Marcel Dekker, Inc.

Suzuki, Hiroshi et al.: "Photo-cationic curable materials using cationic polymerizable monomers such as epoxides and vinyl ether derivatives"; *Polymer Preprints 2001*, 42(2), 733.

Kanoh, Shigeyoshi et al.: "Monomer-Isomerization Polymerization of 3-Methyl-3-(phthalimidomethyl)oxetane with Two Different Ring-Opening Courses"; *Macromolecules 1999*, 32, 2438-2448; 1999 American Chemical Society.

Jansen, Johan F.G.A. et al.: "Effect of Dipole Moment on the Maximum Rate of Photoinitiated Acrylate Polymerizations"; *Macromolecules 2002*, 35, 7529-7531; 2002 American Chemical Society; Communications to the Editor.

Crivello, J. V. et al.: "Structure And Reactivity Relationships In The Photoinitiated Cationic Polymerization Of Oxetane Monomers"; *J.M.S.-Pure Appl. Chem.*, A30(2&3), pp. 189-206 (1993); Marcel Dekker, Inc.

Machida, Shigeru et al.: "The Highly Syn-Selective Michael Reaction Of Enamines With 2-(1-Alkenyl)-1,3-Dioxolan-2-Ylium Cations Generated From 2,2-Dimethoxyethyl 2-Alkenoates In Situ"; *Tetrahedron* vol. 47, No. 23, pp. 3737-3752, 1991; 1991 Pergamon Press plc.

Motoi, Masatoshi et al.: " Preparation of Polyoxetane-Polystyrene Composite Resins and Their Use as Polymeric Supports of Phase-Transfer Catalysts"; *Polymer Journal*, vol. 21, No. 12, pp. 987-1001 (1989).

Pattison, Dexter B.: "Cyclic Ethers Made by Pyrolysis of Carbonate Esters"; *Orchem Laboratories* E.I. DuPont; Jan. 17, 1957.

Smith, Tara J. et al.: "Ring Opening of 2-Ethyl-2-Hydroxymethyl Oxetane Under Basic Conditions"; *Polymer Preprints 2002*, 43(2), 984.

Amass, A. J. et al.: "Studies In Ring-Opening Polymerization-XII. The Ring-Opening Polymerization Of Oxetane To Living Polymers Using A Porphinato-Aluminum Catalyst"; *Eur. Polym. J.* vol. 30, No. 5, pp. 641-646, 1994, Elsevier Science Ltd. 1994.

Takeuchi, Daisuke et al.: "Controlled Coordinate Anionic Polymerization of Oxetane by Novel Initiating Systems: Onium Salts/Bulky Organoaluminum Diphenolates"; *Macromolecules 1996*, 29, 8096-8100.

Kanoh, Shigeyoshi et al.: "Cationic Monomer-Isomerization Polymerization of Oxetanes Having an Ester Substituent, to Give Poly(orthoester) or Polyether"; *Macromol. Chem. Phys. 2002*, 203, 511-521; Wiley-Vch.

Kanoh, Shigeyoshi et al.: "Double Isomerization of Oxetane Amides to Azetidine Esters with Ring Expansion and Contraction"; *J. Org. Chem. 2000*, 65, 2253-2256, 2000 American Chemical Society.

Kudo, Hiroto et al.: "Synthesis of a Hetero Telechelic Hyperbranched Polyether. Anionic Ring-Opening Polymerization of 3-Ethyl-3-(hydroxymethyl)oxetane Using Potassium tert-Butoxide as an Initiator"; Short Communications; *Polym. J.*, vol. 35, No. 1, 2003; pp. 88-91.

Ueyama, Akihiko et al.: "Preparation of Polyoxetane Resins Having Polyoxirane Segments in the Pendant and Cross-Linking Chains and Uses as Polymeric Solvents for Alkali-Metal Ions"; *Polymer Journal*, vol. 34, No. 12, pp. 944-953 (2002).

Sasaki, H. et al.: "The Synthesis, Characterization, And Photoinitiated Cationic Polymerization Of Difunctional Oxetanes"; *J.M.S.-Pure Appl. Chem.*, A29(10), pp. 915-930 (1992).

Publications by *Phillips* Concerning Oxetanes, (2) Search Report.

Singha, Nikhil K. et al.: "Atom Transfer Radical Copolymerization (ATRCP) Of A Monomer Bearing An Oxetane Group"; Polymer Preprints 2002, 43(2), 165.

Hsieh, H.L.: "Terpolymerization of Cyclic Ethers with Cyclic Anhydride"; J. Macromol. Sci.-Chem., A7(7), pp. 1525-1535 (1973).

Bach, Thorsten: "The Paterno-Buchi Reaction of 3-Heteroatom-Substituted Alkenes as a Stereoselective Entry to Polyfunctional Cyclic and Acyclic Molecules"; Liebigs. Ann./Recueil 1997, 1627-1634.

Bach, Thorsten: "Synthesis of syn-and anti-1,2-Amino Alcohols by Regioselective Ring Opening Reactions of cis-3-Aminooxetanes"; Tetrahedron Letters, vol. 38, No. 21, pp. 3707-3710, 1997.

Meijer, Von E.W. et al: "Chiralitat nur im angeregten Zustand"; Angew Chem., 100 (1988) Nr. 7.

* cited by examiner

METHOD OF ATTACHING A DIE TO A SUBSTRATE USING A HYBRID OXETANE COMPOUND

FIELD OF THE INVENTION

This invention relates to curable compositions that contain an oxetane compound having electron acceptor or electron donor functionality.

BACKGROUND OF THE INVENTION

Radical-curable compositions are used in adhesive compositions, for example, in the fabrication and assembly of semiconductor packages and microelectronic devices. There are a number of electron donor/electron acceptor adhesive systems that are used in the industry, but not all these give as full performance as is needed for all uses. There are also adhesive systems that contain both radical-curable moieties and epoxy functionality. Epoxy functionality is not always desirable; thus, the compounds disclosed in this specification add to the spectrum of performance materials for use within the semiconductor fabrication industry.

SUMMARY OF THE INVENTION

This invention relates to compositions for use as adhesives, coatings or encapsulants containing compounds that contain an oxetane functionality and an electron acceptor or an electron donor functionality. The preferred electron acceptor functionality is maleimide. The preferred electron donor functionality is cinnamyl.

The composition can be a paste, prepared by blending or milling, or can be a film, prepared by standard film making techniques known to those skilled in the art. The curable composition will include a curing agent and a filler.

DETAILED DESCRIPTION OF THE INVENTION

Oxetanes, which are highly reactive cyclic ethers, can undergo both cationic and anionic ring opening homopolymerization. Electron donor groups and electron acceptor groups are capable of free radical polymerization. The inventive hybrid compounds, which contain both oxetane and electron donor or electron acceptor functionality, have the capability of undergoing dual cure, both thermal and radiation, processes. This capability makes them attractive in many applications, such as, adhesives, coatings, encapsulants, and composites.

The compounds used in the inventive compositions can be represented by the formula

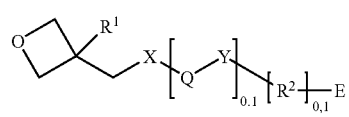

in which $R^1$ is a methyl or ethyl group, $R^2$ is a divalent hydrocarbon, X and Y independently are a direct bond, or an ether, ester, or carbamate functionality, Q is a divalent hydrocarbon, and E is an electron donor or electron acceptor functionality. X and Y will not both be direct bonds in the same molecule. Electron donor functionalities include styrenic, cinnamyl, and vinyl ether groups. Electron acceptor functionalities include maleimide, acrylate, fumarate, and maleate groups.

The compounds are prepared by reacting together a starting compound containing oxetane functionality and a starting compound containing the electron donor or electron acceptor functionality. Typical reaction schemes include well known addition, substitution, and condensation reactions.

Preferred starting compounds containing oxetane functionality include, for example, (a) alcohols, such as, 3-methyl-3-hydroxymethyloxetane, 3-ethyl-3-hydroxymethyloxetane;

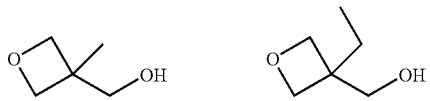

(b) halides, such as, 3-methyl-3-bromomethyloxetane, 3-ethyl-3-bromomethyloxetane, which can be prepared by the reaction of an alcohol from (a) with $CBr_4$ as is known in the art;

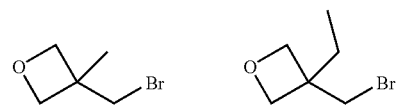

(c) halides, such as, 3-methyl-3-alkylbromomethyloxetane, 3-ethyl-3-alkylbromomethyloxetane, which can be prepared from the reaction of an alkyl dibromide compound with an alcohol from (a) as is known in the art;

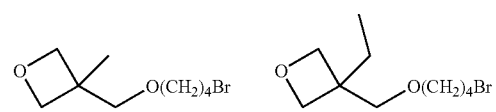

(d) tosylates, such as, 3-methyl-3-tosylmethyloxetane, 3-ethyl-3-tosylmethyl-oxetane, which can be prepared from p-toluenesulfonyl chloride:

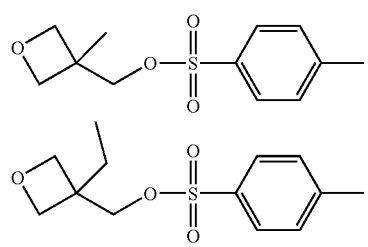

The starting oxetane compound of choice is reacted with a molecule containing an electron donor or electron acceptor functionality and a second functionality reactive with the oxetane starting compound to form a covalent bond through an addition, condensation or substitution reaction.

For example, if an hydroxy oxetane is the starting compound, it may be reacted with a carboxylic acid, acid chloride, or isocyanate containing electron donor or electron acceptor functionality. The X portion of the resulting inventive molecule will be an ester or carbamate functionality.

If a bromide oxetane is the starting compound, it may be reacted, for example, with an alcohol containing an electron donor or electron acceptor functionality. In this case, the X portion of the resulting inventive molecule will be an ether group.

If an alkyl bromide oxetane is the starting compound, it also may be reacted with an alcohol containing an electron donor or electon acceptor functionality. In this case, the X portion of the resulting inventive molecule will be an ether group.

If a tosylate oxetane is the starting compound, it will be reacted with an alcohol containing an electron donor or electron acceptor functionality. In this case X will be an ether group.

Suitable starting compounds containing styrenic functionality are 3-isopropenyl-α,α-dimethyl-benzyl isocyanate (m-TMI) and 4-vinylbenzyl chloride. Other suitable starting compounds containing styrenic functionality can be prepared by the reaction of m-TMI with a diol; or by the reaction of m-TMI with a carboxylic acid containing a hydroxyl group; or by the reaction of isoeugenol with a bromo-oxetane as disclosed earlier.

Suitable starting compounds containing cinnamyl functionality include cinnamyl alcohol and cinnamyl chloride.

Suitable starting compounds containing acrylate functionality include acrylic acid, methacrylic acid, acryloyl chloride, 2-hydroxyethylacrylate, 1,4-chclohexanedimethanol monoacrylate, acrylamide, and methacrylamide.

Suitable starting compounds containing maleate or fumarate functionality include maleic acid, maleic anhydride, fumaric acid, fumaric anhydride.

Suitable starting compounds containing maleimide functionality include 6-maleimidocaproic acid, 3-maleimidoproprionic acid, N-(6-hydroxyhexyl) maleimide, N-(3-hydroxypropyl)maleimide, and N-(5-isocyanatopentyl) maleimide.

If higher molecular weight or longer chain compounds are desired, the starting compounds can be extended into longer chain molecules by reaction with difunctional oligomeric or polymeric materials. The difunctional oligomeric or polymeric material should be chosen to contain one functionality that is reactive with the electron donor or electron acceptor starting compound and one functionality that is reactive with the reactive functionality on the oxetane of choice. The choice and design of such reactions are within the expertise of those skilled in the art and can accomplished with standard addition, substitution, and condensation reactions.

In a further embodiment, the compounds of this invention include polymeric compounds that contain more than one oxetane and more than one electron donor or electron acceptor functionality, or one or more than one each of electron donor and electron acceptor. Such compounds are prepared from a polymeric starting compound from which depend functionalities that are reactive with one or more of the starting oxetane compounds and one or more of the starting electron donor and electron acceptor compounds.

For example, a poly(butadiene) having pendant hydroxyl groups can be reacted with the oxetane starting compound containing the tosyl leaving group and with m-TMI to provide a polymeric compound having both styrenic and oxetane functionality. Alternatively, cinnamyl chloride, 6-maleimidocaproic acid, or acrylic acid, could be used instead of M-TMI to add, respectively, cinnamyl, maleimide, or acrylate functionality. As a further example, a poly (butadiene) having pendant carboxylic acid functionality can react with either of the hydroxy oxetane starting materials and an electron donor or electron acceptor containing hydroxyl functionality, for example, cinnamyl alcohol.

The polymeric starting material can be purchased commercially. Suitable commercially available polymers include acrylonitrile-butadiene rubbers from Zeon Chemicals and styrene-acrylic copolymers from Johnson Polymer. The pendant functionalities from these polymers are hydroxyl or carboxylic acid functionality.

Other starting polymeric materials can be synthesized from acrylic and/or vinyl monomers using standard polymerization techniques known to those skilled in the art. Suitable acrylic monomers include α,β-unsaturated mono and dicarboxylic acids having three to five carbon atoms and acrylate ester monomers (alkyl esters of acrylic and methacrylic acid in which the alkyl groups contain one to fourteen carbon atoms). Examples are methyl acryate, methyl methacrylate, n-octyl acrylate, n-nonyl methacrylate, and their corresponding branched isomers, such as, 2-ethylhexyl acrylate. Suitable vinyl monomers include vinyl esters, vinyl ethers, vinyl halides, vinylidene halides, and nitriles of ethylenically unsaturated hydrocarbons. Examples are vinyl acetate, acrylamide, 1-octyl acrylamide, acrylic acid, vinyl ethyl ether, vinyl chloride, vinylidene chloride, acrylonitrile, maleic anhydride, and styrene.

Other polymeric starting materials can be prepared from conjugated diene and/or vinyl monomers using standard polymerization techniques known to those skilled in the art. Suitable conjugated diene monomers include butadiene-1, 3,2-chlorobutadiene-1,3, isoprene, piperylene and conjugated hexadienes. Suitable vinyl monomers include styrene, α-methylstyrene, divinylbenzene, vinyl chloride, vinyl acetate, vinylidene chloride, methyl methacrylate, ethyl acrylate, vinylpyridine, acrylonitrile, methacrylonitrile, methacrylic acid, itaconic acid and acrylic acid. Those skilled in the art have sufficient expertise to choose the appropriate combination of those monomers and subsequent reactions to be able to add pendant hydroxyl and carboxyl functionality for adding the oxetane and electron donor and electron acceptor functionalities.

In addition to the compounds containing oxetane and electron donor or electron acceptor functionality, the curable compositions of this invention will include curing agents and filler. Suitable curing agents are thermal initiators and photoinitiators present in an effective amount to cure the composition. In general, those amounts will range from 0.1% to 30%, preferably 1% to 20%, by weight of the total organic material (that is, excluding any inorganic fillers) in the composition. Preferred thermal initiators include peroxides, such as butyl peroctoates and dicumyl peroxide, and azo compounds, such as 2,2'-azobis(2-methyl-propanenitrile) and 2,2'-azobis(2-methyl-butanenitrile). A preferred series of photoinitiators are those sold under the trademark Irgacure or Rhodorsil 2074 by Ciba Specialty Chemicals. In some formulations, both thermal initiation and photoinitiation may be desirable: the curing process can be started either by irradiation, followed by heat, or can be started by heat, followed by irradiation.

In general, the curable compositions will cure within a temperature range of 60° C. to 250° C., and curing will be effected within a range of three seconds to three hours. The actual cure profile will vary with the components and can be determined without undue experimentation by the practitioner.

The curable compositions will also comprise nonconductive or thermally or electrically conductive fillers. Suitable conductive fillers are carbon black, graphite, gold, silver, copper, platinum, palladium, nickel, aluminum, silicon carbide, boron nitride, diamond, and alumina. Suitable nonconductive fillers are particles of vermiculite, mica, wollastonite, calcium carbonate, titania, sand, glass, fused silica, fumed silica, barium sulfate, and halogenated ethylene polymers, such as tetrafluoroethylene, trifluoro-ethylene, vinylidene fluoride, vinyl fluoride, vinylidene chloride, and vinyl chloride. Fillers generally will be present in amounts of 20% to 90% by weight of the formulation.

These compositions are useful for attaching semiconductor dies to substrates, such as, to metal leadframes. In a typical operation, the adhesive is dispensed onto the center paddle of the leadframe and the silicon die contacted to the adhesive with heat and pressure. The exact processing parameters may vary from operation to operation, but are known to those skilled in the art.

EXAMPLES

The following examples show methods of synthesis for a variety of the inventive compounds and performance data showing their suitability as adhesives.

Example 1

Preparation of Cinnamyl Ethyl Oxetane

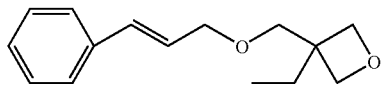

3-Ethyl-3-oxetane methanol (27.03 g, 0.2326 mole), toluene (100 ml), tetrabutyl ammonium hydrogen sulfate (17.38 g, 0.0512 mole) and 50% sodium hydroxide solution (300 ml) were combined in a 1 L 4-neck round bottom flask equipped with a condenser, mechanical mixer and oil bath. The mixture was stirred vigorously and the oil bath was heated to 90° C. at which temperature the solids were totally dissolved.

Cinnamyl chloride (35.50 g, 0.2326 mole) was added over approximately 35 minutes. The reaction was heated at 90° C. with mixing for an additional 1.25 hour and then allowed to cool to room temperature. The organic phase was isolated in a separatory funnel and washed four times with 20% sodium chloride solution (200 ml each). As a result, the washes changed from cloudy yellow to hazy colorless and the pH of the washes dropped from 12 to 6. The last of four more washes (200 ml) using distilled water was an emulsion, which separated over night. After the emulsion separated, a clear orange organic fraction was collected and mixed for one hour with silica gel (60 g). Solids were then filtered out, and the reaction solution was stripped of toluene in vacuo resulting in a clear orange liquid with a viscosity of <100 cPs at 25° C., and a volatility of 93% at 200° C. as measured by thermogravimetric analysis (TGA).

H$^1$-NMR: δ 7.15–7.51 (m, 5H), 6.12–6.25 (d, 1H), 6.30–6.42 (m, 1H), 4.51–4.71 (d, 2H), 4.41–4.51 (d, 2H), 4.15–4.25 (d, 2H), 3.65 (s, 2H), 1.85–1.90 (m, 2H), 1.85–1.95 (t, 3H).

Example 2

Preparation of Styrene Carbamate Ethyl Oxetane

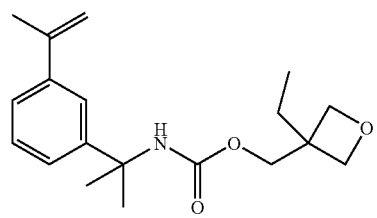

3-Ethyl-3-hydroxymethyl-oxetane (40.00 g, 0.3442 mole) and m-TMI (69.43 g, 0.3442 mole) were combined in a 250-ml four-neck round bottom flask equipped with a condenser, mechanical mixer, nitrogen purge and oil bath. The reaction was placed under nitrogen with stirring and heated to 65° C. in the oil bath. A single drop of dibutyltin dilaurate was added, thereby causing an exothermic reaction which peaked at 125° C. The oil bath was removed and the reaction temperature dropped to 65° C. within 15 minutes. At this point, the reaction was complete based on the depletion of the FT-IR isocyanate peak at 2254 cm$^{-1}$. The product was then removed from the flask as a viscous colorless liquid; however, over time it crystallized into a white solid with a m.p. of 52° C. The compound had a viscosity of 14,000 cPs and a 30% weight loss at 200° C. as measured by TGA.

H$^1$-NMR: δ 7.21–7.61 (m, 4H), 5.45 (s, 1H), 5.23 (bs, 1H), 5.12 (s, 1H), 4.61–4.21 (bm, 3H), 4.05 (s, 3H), 2.15 (s, 3H), 1.55–1.85 (bm, 8H), 0.55–1.01 (bm, 3H).

Example 3

Preparation of Ethyl Oxetane Maleimide

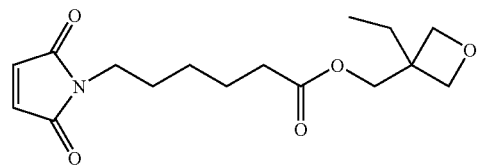

A 250-ml 4-neck round bottom flask was equipped with a mechanical stirrer, thermometer, nitrogen purge and slow-addition funnel. 6-Maleimideocaproic acid (MCA) (25.59 g, 0.1213 mole), 3-ethyl-3-oxetane methanol (14.10 g, 0.1213 mole), 4-dimethylaminopyridine (1.5 g, 0.0121 mole) and toluene (60 ml) were charged to the flask resulting in a dark gold solution with a minor amount of undissolved solids. The flask contents were chilled to 0–5° C. with mixing. A solution prepared from 1,3-dicyclohexyl-carbodiimide (DCC, 25.00 g, 0.1213 mole) and toluene (20 ml) was then charged to the slow-addition funnel. The DCC/toluene solution was added to the flask over 30 minutes while maintaining a reaction temperature between 10 and 15° C.

Stirring was continued for six hours at 10–15° C. after which time thin layer chromatography (1/1 ethyl acetate/hexane) indicated that both the oxetane and DCC were consumed. The reaction was stopped and white solids were filtered from the red-orange solution. Next, this reaction solution was washed three times with an equivalent volume of a saturated sodium bicarbonate solution. Toluene was then stripped from the reaction in vacuo and replaced with a solution of ethyl acetate and hexane (1/1 by volume). A chromatography column was then utilized to isolate a qualitative amount of a clear yellow oil with a viscosity of 270 cPs. The compound had a weight loss of 15% at 200° C. as measured by TGA.

H$^1$-NMR: δ 6.55 (s, 2H), 4.55 (d, 2H), 4.45 (d, 2H), 4.21 (s, 2H), 3.41–3.52 (t, 2H), 2.25–2.42 (t, 2H), 1.51–1.79 (m, 4H), 1.11–1.41 (m, 4H), 0.83–0.95 (t, 3H).

Example 4

Preparation of Methyl Oxetane Maleimide

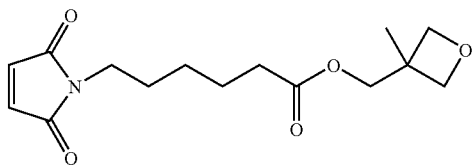

The starting compound for methyl oxetane maleimide is maleimidocaproic chloride having the structure

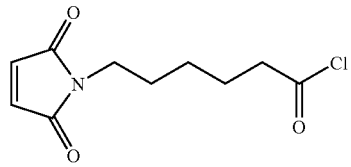

and prepared as follows: A 500-ml 4-neck round bottom flask was equipped with a condenser, mechanical mixer, thermometer, and hot oil bath and then charged with maleimidocaproic acid (MCA) (40.00 g, 0.1896 mole), dimethylformamide (3 drops) and toluene (125 ml). The flask contents were heated to 85° C. and mixed until all solids were dissolved. Subsequently, the hot solution was decanted into a similar flask fitted with a mechanical mixer, bubbler, slow-addition funnel and ice bath. The reaction solution was then chilled with mixing.

Oxalyl chloride (36.09 g, 0.2844 mole) was added to the reaction flask via slow-addition funnel while maintaining a reaction temperature of 5–10° C. Following the oxalyl chloride addition, the ice bath was removed and the reaction was allowed to warm to room temperature. As the reaction temperature increased, the bubbler indicated that gas was being generated. The reaction was left to mix over night resulting in a very dark solution. It was then decanted into a 1 L single-neck round bottom flask and stripped of toluene under vacuum. Toluene (200 ml) was then added to the flask and stripped three times to reduce acidity. The product was maleimidocaproic chloride.

3-Methyl-3-oxetane methanol (19.36 g, 0.1896 mole), triethylamine (19.19 g, 0.1896 mole), 4-dimethylaminopyridine (2.32 g, 0.0190 mole) and dichloromethane (175 ml) were combined in a 500-ml 4-neck round bottom flask equipped with a magnetic stir bar, slow-addition funnel, drying tube and ice bath. A nitrogen purge was used to displace humid air within the flask. The reaction solution was then chilled with mixing to 10° C. and a solution of maleimideocaproic chloride (43.4 g, 0.1896 mole) in 25 ml dichloromethane was added at a rate slow enough to maintain this temperature.

Following the addition, the resulting dark brown solution was mixed at room temperature over-night. Thin-layer chromatography (1/1 vol., ethyl acetate/hexane) indicated that the reaction was complete based on the depletion of maleimidocaproic chloride. White solids were filtered from the reaction solution which was then washed four times with distilled water (300 ml each). Methylene chloride was stripped from the reaction solution via roto-evaporation and replaced with an ethyl acetate/hexane solution (2/1, respectively, by volume). The dark brown solution was then passed through a column of silica gel to purify. Next, the solvent was stripped in vacuo resulting in a clear orange product with a viscosity of 750 cPs. The compound had a weight loss of 8% as measured by TGA.

H$^1$-NMR: δ 6.65 (s, 2H), 4.45 (d, 2H), 4.31 (d, 2H), 4.06 (s, 2H), 3.46–3.61 (m, 2H), 2.31 (t, 2H), 1.45–1.65 (m, 4H), 1.16–1.29 (m, 5H).

Example 5

Preparation of Styrene Carbamate Methyl Oxetane

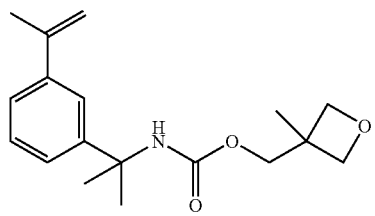

3-Methyl-3-oxetane methanol (20.00 g, 0.1958 mole) and m-TMI (39.49 g, 0.1958 mole) were combined in a 250-ml four-neck round bottom flask equipped with a condenser, mechanical mixer, thermometer, nitrogen purge and oil bath. The reaction was placed under nitrogen with stirring and heated to 65° C. in the oil bath. A single drop of dibutyltin dilaurate was added and within 5 hours the reaction was complete based on depletion of the FT-IR isocyanate peak (2254 cm$^{-1}$). The product was then removed from the flask as a colorless liquid with a viscosity of 21,000 cPs. The compound had a 19% weight loss as measured by TGA.

H$^1$-NMR: δ 7.61 (s, 1H), 7.42 (s, 3H), 5.45 (s, 1H), 5.31 (bs, 1H), 5.15 (s, 1H), 4.61 (bm, 1H), 4.39 (bm, 1H), 4.12 (s, 4H), 2.21 (s, 3H), 1.72 (bs, 6H), 0.95–1.35 (bm, 3H).

Example 6

Preparation of Ethyl Oxetane Methacrylate

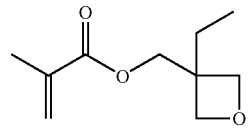

3-Ethyl-3-oxetane methanol (55.58 g, 0.4783 mole), acetone (120 mL) and triethylamine (48.4 g, 0.4783 mole) were charged to a 1 L, 4-neck, round-bottom-flask equipped with a mechanical mixer, thermometer, nitrogen purge and slow-addition funnel. The flask and contents were chilled in an ice bath while mixing and purging with nitrogen. Meanwhile, methacryloyl chloride (50.00 g, 0.4783 mole) was diluted with 92 mL of acetone. The resulting solution was then charged to the addition funnel mounted on the flask. The methacryloyl chloride solution was slowly added to the reaction flask while maintaining a reaction temperature of <10° C. The slow addition of the methacryloyl chloride solution lasted two hours and forty minutes. During this time, the clear colorless solution changed to a pale gold mixture with white precipitate. The mixture was allowed to mix overnight at room temperature.

The following morning, the white precipitate was filtered from the mix, leaving a dark red-brown solution. Methyl hydroquinone was added to the solution at ~1000 ppm and the acetone was stripped. The resulting thin brown liquid was then dissolved in 100 mL methylene chloride and washed five times with 200 mL of a 5% sodium chloride solution. This was followed by two water washes of 300 mL each. The resulting pH was 9. Another 1000 ppm of methyl hydroquinone was added to the solution and the methylene chloride was then stripped. The resulting dark liquid was then dissolved in ethyl acetate and the solution was run through silica gel (5 tbsp) in a glass Buchner funnel. The solvent was stripped from the clear orange solution resulting in a clear brown product. To remove residual solvent, air was then bubbled through the product overnight. The structure of this dark-brown liquid was confirmed by NMR and determined to be ~93 mole % pure.

Example 7

Performance

In order to assess the suitability of the oxetane compounds as substitutes for epoxy compounds in an adhesive formulation, a control adhesive formulation was prepared to contain the components shown in Table 1:

TABLE 1

Control Adhesive Formulation

| Component | Source | Weight % |
|---|---|---|
| bismaleimide | proprietary | 51.8 |
| dimethacrylate | SR248 from Sartomer | 26.0 |
| tetraacrylate | SR355 from Sartomer | 13.0 |
| epoxy | proprietary | 7.8 |
| peroxide initiator | Perkadox 16 from Akzo Nobel | 1.0 |
| imidazole | ZCN from Aldrich | 0.4 |

The proprietary bismaleimide resin has the following structure in which $C_{36}$ is a 36 carbon chain, the residue of dimer diol:

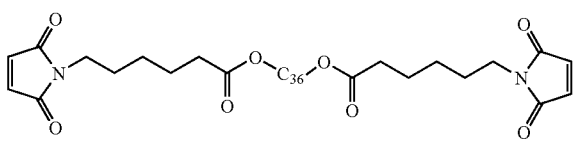

The proprietary epoxy resin has the following structure:

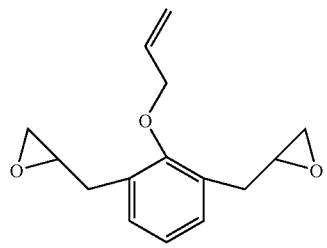

The oxetane compounds from Examples 2, 3, 4, and 5 were substituted into the formulation at the same weight percent for the epoxy resin. The thermodynamic and kinetic properties were measured by DSC and compared to the control formulation. The data are reported in Table 2 and show that the major curing peaks for all five formulations are similar and exothermic. A minor peak follows the major peak in each case; however, the minor peaks are small with the heat of polymerization values ranging from only −8 to −32 Joules/gram. These results suggest that relative to the control, the formulations with the oxetane compounds promote more cross-linking at a lower temperature.

TABLE 2

Kinetic and Thermodynamic Properties of Formulations with epoxy and with oxetane

| Formulation with: | Cure Temp Peak # 1 (° C.) | H Δ (J/g) | Cure Temp Peak #2 (° C.) | H Δ (J/g) |
|---|---|---|---|---|
| Epoxy control | 95 | −199 | 223 | −85 |
| Oxetane example 2 | 91 | −264 | 151 | −12 |
| Oxetane example 3 | 93 | −282 | 149 | −8 |
| Oxetane example 4 | 94 | −271 | 165 | −32 |
| Oxetane example 5 | 94 | −280 | 153 | −14 |

Example 8

An adhesive formulation for use as a die attach was prepared to contain the components as shown in Table 3. A set of die and substrate assemblies (A to D) was prepared by attaching 120×120 mil silicon dies to metal substrates with the adhesive. A drop of the adhesive was deposited on the substrate, the die was contacted to the adhesive with light pressure, and the adhesive was cured by placing the substrate on a hot plate. After cure, the dies were sheared from the substrates using a Royce Instruments System 552 die shear tester. The curing time and temperature for the adhesive and the die shear strengths are reported in Table 4.

A second set of silicon die and substrate assemblies (E to H) was prepared in the same way, except that after cure on the hot plate, the die and substrate assembly was subjected to 145° C. for 16 hours. Die shear strength was tested on a Royce Instruments System 552 die shear tester. The curing time and temperature for the adhesive and the die shear strengths are reported in Table 4.

TABLE 3

ADHESIVE FORMULATION

| COMPONENT | WEIGHT % |
| --- | --- |
| bismaleimide | 20.0 |
| same as Example 6 | |
| poly(butadiene) | 4.0 |
| RICON product # 131/MA10 | |
| dimethacrylate | 10.0 |
| SR248 from Sartomer | |
| tetraacrylate | 5.0 |
| SR355 from Sartomer | |
| oxetane | 3.0 |
| from Example 2 | |
| peroxide initiator | 0.5 |
| Perkadox 16 from Akzo Nobel | |
| imidazole | 0.1 |
| ZCN from Aldrich | |
| surfactant Fluowet OTN | 0.2 |
| from Toagosei America | |
| silane adhesion promoter | 0.3 |
| Witco | |
| silica filler from Package Care | 56.9 |

TABLE 4

Die Shear Strength

| Assembly | Cure Conditions | DSS (KgF) |
| --- | --- | --- |
| A | 20 sec @ 100° C. | 0.4 |
| B | 30 sec @ 100° C. | 2.5 |
| C | 10 sec @ 120° C. | 3.5 |
| D | 30 sec @ 120° C. | 4.9 |
| E | 10 sec @ 100° C. | 6.9 |
| F | 20 sec @ 100° C. | 7.1 |
| G | 30 sec @ 100° C. | 6.6 |
| H | 10 sec @ 120° C. | 8.5 |

The data show acceptable commercial performance of the formulation containing oxetane.

What is claimed is:

1. A method of attaching a silicon die to a substrate comprising disposing an adhesive between the die and the substrate and curing the adhesive with heat, in which the adhesive is a curable composition comprising (a) a compound containing an oxetane functionality and an electron donor or electron acceptor functionality, represented by the formula

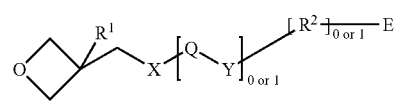

in which $R^1$ is a methyl or ethyl group, $R^2$ is a divalent hydrocarbon,

Q is a divalent hydrocarbon,

X and Y are indenlendently a direct bond, or an ether, ester, or carbamate functionality, provided that X and Y are not both direct bonds, and E is a styrenic, cinnamyl, vinyl ether, maleimide, acrylate, fumarate, or maleate group;

(b) a curing agent, and (c) a filler.

2. The method according to claim 1 in which E is a maleimide or cinnamyl group.

\* \* \* \* \*